(12) United States Patent
Roodenburg et al.

(10) Patent No.: US 9,586,654 B2
(45) Date of Patent: Mar. 7, 2017

(54) MONOHULL OFFSHORE DRILLING VESSEL

(71) Applicant: ITREC B.V., Schiedam (NL)

(72) Inventors: Joop Roodenburg, Delft (NL);
Diederick Bernardus Wijning, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 14/911,979

(22) PCT Filed: Aug. 14, 2014

(86) PCT No.: PCT/NL2014/050561
§ 371 (c)(1),
(2) Date: Feb. 12, 2016

(87) PCT Pub. No.: WO2015/023182
PCT Pub. Date: Feb. 19, 2015

(65) Prior Publication Data
US 2016/0200401 A1 Jul. 14, 2016

(30) Foreign Application Priority Data
Aug. 16, 2013 (NL) ...................................... 2011313

(51) Int. Cl.
*E21B 15/02* (2006.01)
*B63B 27/10* (2006.01)
(Continued)

(52) U.S. Cl.
CPC .............. *B63B 27/10* (2013.01); *B01D 33/03* (2013.01); *B01D 33/41* (2013.01); *B01D 33/72* (2013.01);
(Continued)

(58) Field of Classification Search
CPC ...... E21B 15/02; E21B 21/001; E21B 21/065; B63B 3/00; B63B 27/10; B63B 35/4413
See application file for complete search history.

(56) References Cited

U.S. PATENT DOCUMENTS 3,850,125 A * 11/1974 Anders ................... B63B 35/10
114/40
3,963,605 A 6/1976 Seabourn
(Continued)

FOREIGN PATENT DOCUMENTS

GB         2170248 A     7/1986
NL    WO 2009102196 A2 *  8/2009 ......... B63B 35/4413
(Continued)

*Primary Examiner* — Matthew R Buck
(74) *Attorney, Agent, or Firm* — Birch, Stewart, Kolasch & Birch, LLP (57) ABSTRACT

The present invention relates to a monohull offshore drilling vessel comprising a hull with a bow and a stern and a moonpool extending through the hull, the hull having an upper deck. A firing line hoist system comprising a mast is mounted on the hull. A drill floor is provided at a firing line side of the mast, which covers a portion of the moonpool while the firing line extends through an opening in said drill floor. Furthermore marine equipment and drilling equipment for performing auxiliary operations for the drilling or drilling related operations is provided, which equipment is mainly provided in the hull of the vessel below the upper deck. According to the invention, the drill floor is flush with the upper deck.

16 Claims, 8 Drawing Sheets

(51) Int. Cl.
*B63B 35/44* (2006.01)
*B01D 33/03* (2006.01)
*B01D 33/41* (2006.01)
*B01D 33/72* (2006.01)
*B63B 3/00* (2006.01)
*E21B 15/00* (2006.01)
*E21B 21/06* (2006.01)

(52) U.S. Cl.
CPC ............ *B63B 3/00* (2013.01); *B63B 35/4413* (2013.01); *E21B 15/00* (2013.01); *E21B 15/02* (2013.01); *E21B 21/065* (2013.01)

(56) References Cited

U.S. PATENT DOCUMENTS

| | | | |
|---|---|---|---|
| 6,220,194 B1 | 4/2001 | Kjersem | |
| 6,325,159 B1 * | 12/2001 | Peterman | E21B 21/001 |
| | | | 166/350 |
| 6,415,877 B1 * | 7/2002 | Fincher | B63B 21/502 |
| | | | 175/25 |
| 6,712,560 B1 | 3/2004 | Cottrell | |
| 6,871,609 B2 * | 3/2005 | Roodenburg | B63B 15/00 |
| | | | 114/201 R |
| 6,988,459 B2 * | 1/2006 | Roodenburg | B63B 15/00 |
| | | | 114/201 R |
| 7,021,402 B2 * | 4/2006 | Beato | E21B 15/003 |
| | | | 166/345 |
| 9,045,948 B2 * | 6/2015 | Roodenburg | E21B 15/02 |
| 9,205,894 B2 * | 12/2015 | Lee | B63H 21/34 |
| 2007/0251695 A1 | 11/2007 | Haynes et al. | |
| 2010/0116507 A1 * | 5/2010 | Haugland | E21B 19/002 |
| | | | 166/352 |
| 2010/0300697 A1 * | 12/2010 | Wijning | E21B 17/20 |
| | | | 166/352 |
| 2010/0314121 A1 | 12/2010 | Sorenson et al. | |
| 2011/0240305 A1 * | 10/2011 | Kristensen | B63B 35/4413 |
| | | | 166/345 |
| 2012/0103623 A1 * | 5/2012 | Wijning | E21B 19/146 |
| | | | 166/352 |
| 2013/0062261 A1 | 3/2013 | Bailey | |
| 2013/0160693 A1 | 6/2013 | Roodenburg et al. | |
| 2014/0144708 A1 * | 5/2014 | Sherwood | E21B 15/00 |
| | | | 175/66 |
| 2014/0161569 A1 * | 6/2014 | Zijlmans | B63B 35/4413 |
| | | | 414/142.8 |

FOREIGN PATENT DOCUMENTS

| | | | | |
|---|---|---|---|---|
| NL | WO 2009102197 A2 * | 8/2009 | ......... | B63B 35/4413 |
| NL | WO 2012005587 A1 * | 1/2012 | ......... | B63B 35/4413 |
| NL | WO 2012087119 A1 * | 6/2012 | ............ | E21B 15/02 |
| WO | WO 2009/102196 A2 | 8/2009 | | |
| WO | WO 2009/102197 A2 | 8/2009 | | |

* cited by examiner

MONOHULL OFFSHORE DRILLING VESSEL

The present invention relates to a monohull offshore drilling vessel, e.g. for oil and gas exploration, well servicing, etc.

In WO2009/102196 and WO2009/102197, a prior art drilling vessel from the applicant is disclosed. This vessel is commercially known as Noble Globetrotter. One of the advantages of this vessel, explained in WO2009/102196, is the improved design wherein drilling facilities are stored in the hull, resulting in a relatively low mass center of gravity. Another advantage of this design, described in WO 2009/102197, is the mobile working deck allowing a low active position of the working deck, and allowing BOP handling in an inactive position of the working deck. The overall layout resulted in a drill floor being arranged at a limited height above the upper deck, e.g. at a height between 2 and 7 meters above the upper deck, preferably about 5 meters.

Prior art monohull offshore drilling vessels are known to comprise:
- a hull with a bow and a stern and a moonpool extending through the hull,
- an accommodation topside having crew quarters and a bridge, said accommodation topside being arranged on the hull at the bow,
- the hull having an upper deck between the accommodation topside and the stern of the vessel,
- a firing line hoist system that is mounted on the hull at said moonpool, which firing line hoist system comprises a mast, which is connected to the hull at the moonpool of the drilling vessel, which mast has a hollow construction,
- a hoisting device supported by the mast and having a load attachment device displaceable along a firing line, which extends on the outside of and adjacent to a firing line side of the mast, and which firing line extends through the moonpool, wherein the hoisting device is adapted to be used for drilling or drilling related operations, which hoisting device includes one or more cables and one or more associated winches, the winches preferably disposed in the hollow construction of the mast, to manipulate the position of a load attachment device relative to the mast,
- a drill floor provided at the firing line side of the mast, which covers a portion of the moonpool while the firing line extends through an opening in said drill floor,
- a riser-tensioner for exerting a tensile force from the drilling vessel upon a riser, wherein the riser-tensioner is provided below the drilling floor,
- marine equipment, drilling equipment for performing auxiliary operations for the drilling or drilling related operations.

As indicated above, it is also known to provide drilling equipment in the hull of the vessel below the upper deck, wherein the drilling equipment comprises one or more of:
- a pipe storage for storing drill pipes in a substantially horizontal position,
- a riser storage for storing risers in a substantially horizontal position,
- a BOP storage area for storing a BOP (Blow Out Preventer),
- a silo room for accommodating silos,
- a mud tank for storing drilling mud,
- a storage tank for storing fluids such as base oil or brine,
- a pump room for accommodating pumps such as mud pumps,
- burner booms.

The aim of the present invention was to further improve the vessel design. This is achieved according to the present invention by providing a monohull drilling vessel according to the preamble of claim 1, characterized in that the drill floor is flush with the upper deck, and in that drilling equipment and marine equipment is provided in the hull of the vessel below the upper deck.

By adjusting the overall dimensions of the vessel, this advantageous design resulted in an elevated level of the upper deck, namely flush, i.e. at the same level of the drill floor. This resulted in a construction in which an optimized balance between weight and strength is found, while also being able to easily perform all necessary handling of drilling tubulars and other accessories. An advantage of a drill floor being flush with the upper deck is that crew can simply walk from the drill floor to the upper deck, ant that a trolley, e.g. on rails, can be driven from the drill floor to the upper deck without the need of a ramp or similar structure. Hence, the flush drill floor and upper deck allows for easy movement of persons and objects between upper deck and drill floor.

Another advantage is the increased strength of the vessel. The moonpool is a through-hole through the hull of the vessel. A moonpool wall surrounds this through-hole. The strength of the vessel around the moonpool is determined by the relative dimensions of hull and moonpool wall. Inside the lower portion of the moonpool, water is present, the waterline being on the moonpool wall. In general, the upper level of the moonpool wall is provided at a distance from the deck level, to allow equipment handling above the moonpool. In a design wherein around the moonpool a relatively low upper deck is provided, a relatively low moonpool wall is present. It is advantageous to have the entire upper deck at a higher level, and to have an increased height of the moonpool wall, as this contributes to the strength of the vessel around the moonpool. In particular, the bending moment of the deck here may be reduced.

There are multiple advantages of storing equipment below the upper deck. The equipment, in particular the pipes and risers, represent a significant amount of weight. By arranging the pipe storage and the riser storage as deep inside the vessel as possible, e.g. at the floor of the hold, the mass centre of gravity of the ship comes to lie relatively low in the vessel as compared to a situation in which the drill pipes and risers are stored on deck. A low center of gravity enables a relatively light construction of the vessel.

Moreover, the equipment can be stored efficiently, resulting in a more compact overall geometry of the vessel. In general, it is advantageous to have a vessel offering the same performance but on a vessel of smaller size. Because the vessel is smaller, less power is required for station keeping and transit. Therefore less thrusters and engine power may be installed offering lower fuel consumption.

Furthermore, by storing drilling and marine equipment below the upper deck, the upper deck is available for other purposes. The large free and flat deck area is for example advantageous for the storage of additional pipes and/or risers.

In an embodiment of a monohull offshore drilling vessel according to the first aspect of the invention the vessel is adapted to perform pipelaying operations. In particular, pipelaying equipment such as tensioners may be adapted to be installed in the firing line, e.g. connected to the mast. In addition, the large free deck area on the upper deck preferably comprises a storage area for pipelaying equipment, such as storage reels for (flexible) pipes. The advantage of an easy accessible firing line and a large free deck area results in the ability to provide all the required pipelaying equipment on the offshore drilling vessel, which further expands the options for use of the monohull offshore drilling vessel according to the present invention.

The monohull offshore drilling vessel according to the present invention is preferably a dynamically positioned drill ship suitable for performing operations up to 12.000 ft. (3650 meters) water depth, arctic waters being optional. The overall length is preferably between 180-200 meters, and breadth 30-35 meters. The layout according to the present invention enables an upper flat deck area of over 4000 m².

According to the invention, the vessel comprises a hull with a bow and a stern and a moonpool extending through the hull, an accommodation topside having crew quarters and a bridge, said accommodation topside being arranged on the hull at the bow. The hull has an upper deck between the accommodation topside and the stern of the vessel. As is preferred the upper deck has a uniform height above waterline throughout, allowing easy transport of items as well as walking of crew members over the deck. It is noted that in the offshore industry, the upper deck is frequently also referred to as the main deck, onto which some of the drilling equipment and/or marine equipment conventionally is provided. In the vessel design of the present invention, the upper deck is at a relatively elevated level, allowing most of the equipment to be provided below the upper deck, on a 'tween' deck. It is thus conceivable that one refers to this 'tween' deck comprising the equipment which is normally present on the main deck as the 'main deck'. Throughout this application, the 'upper deck' is the uppermost deck of the vessel.

Advantageously, the hull has one or more holds having a floor and a side wall, and wherein at least part of the drilling and/or marine equipment is arranged on the floor of the hold.

In addition, it is advantageous to provide the lateral side of the hull of the vessel with one or more recessed storage areas for the storage of equipment, the recessed storage areas being lower than the level of the upper deck, such that the equipment stored therein, e.g. drilling equipment and/or marine equipment, does not project beyond the plane of the lateral side of the hull of the vessel. Such a storage area is e.g. suitable for the storage of marine equipment such as fastboats, or drilling equipment such as burner booms.

The vessel according to the invention comprises a firing line hoist system that is mounted on the hull at said moonpool, which firing line hoist system comprises a mast, which is connected to the hull at the moonpool of the drilling vessel. Preferably the mast has a rectangular cross-section and a hollow construction. Preferably, the mast has a contiguous outer wall, so that its interior is shielded from the weather.

According to the invention, a hoisting device is supported by the mast, having a load attachment device displaceable along a firing line, which extends on the outside of and adjacent to a firing line side of the mast, and which firing line extends through the moonpool, wherein the hoisting device is adapted to be used for drilling or drilling related operations. The hoisting device includes one or more cables and one or more associated winches, the winches preferably being disposed in the hollow construction of the mast, to manipulate the position of a load attachment device relative to the mast. Preferably the one or more winches of the hoisting device are arranged at the lower end of the mast.

In a possible embodiment, the firing line hoist system is a multiple firing line hoist system comprising a first hoisting device supported by the mast and having a first load attachment device displaceable along a first firing line, which extends on the outside of and adjacent to a first firing line side of the mast, and a second hoisting device supported by the mast and having a second load attachment device displaceable along a second firing line, which extends on the outside of and adjacent to a second firing line side of the mast; wherein the first firing line side of the mast is opposite the second firing line side of the mast. Preferably, the first and second hoisting devices each include one or more cables and one or more associated winches, the winches preferably disposed in the hollow construction of the mast, to manipulate the position of each of the load attachment devices relative to the mast.

It is noted that the first and second side of the mast preferably correspond to the front and rear side of the mast, wherein it is in general of no interest which of the first and second side is the front side.

In an embodiment, a top portion of the mast of the firing line hoist system is removable, e.g. allowing easy bridge passage. The top portion of the mast can conveniently be stored on the large free space on the upper deck.

The vessel according to the invention comprises a drill floor provided at the firing line side of the mast, which covers a portion of the moonpool while the firing line extends through an opening in said drill floor. In a dual firing line hoist system, two drill floors may be provided at both the first and second firing line side of the mast. According to the present invention, the drill floor is flush with the upper deck of the vessel.

The drill floor may be a single structural element with an opening for allowing drilling tubulars in the firing line to pass the drill floor, but may alternatively be composed of multiple structural elements, such as moveable hatches, which together can form a substantially rectangular drill floor and leave an opening free in between the structural elements for the firing line.

The drill floor is a working deck adapted to perform particular drilling operations. The drill floor may be used by personnel to get in close proximity of the firing line. The drill floor can be, or is, preferably outfitted with one or more of the following components:
- rotary table, also utilized as a mouse hole, with automated power slips,
- iron roughneck
- hydraulic catheads
- catwalk machine for tubulars and risers
- drillers cabin
- man riding winch
- hatches above the riser tensioner cylinders for maintenance or removal
- choke and kill manifold, dual stand pipe manifold and cement manifold
- wind wall, e.g. 3-5 meters high
- cherry picker.

The level of the drill floor is influenced at least by the water level in the moonpool, upper level of a wall surrounding the moonpool, which are determined by overall vessel geometry.

Furthermore, according to the present invention, it is desired to provide a riser-tensioner for exerting a tensile force from the drilling vessel upon a riser, below the drill floor. As part of the riser-tensioner is required to be above the waterline, this further determines the minimum level of the drill floor. The riser-tensioner preferably comprises a riser ring to be fastened to the top end of the riser, and one or more cables extending by way of cable pulleys from said vessel to said riser ring, said cable pulleys being under such influence of tensioning means that a tensioning force can be applied to the cable.

Furthermore, mud treatment requires a certain degree of decay, starting from the drill floor. Hence, this further determines the minimum level of the drill floor.

The drill floor may be moveable, e.g. to allow the passing of relatively large objects. In a possible embodiment, the drill floor is mobile between an active position in which it is flush with the upper deck and covers a portion of the moonpool at said firing line side of the mast while the firing line extends through an opening in said drill floor, and a non-active position of the drill floor, allowing equipment to be brought in the firing line above the moonpool and manipulated by the hoisting device. Such a mobile drill floor increases the accessibility of the firing line for all types of equipment, such as a BOP, X-mas tree or a mudlift pump.

In a preferred embodiment wherein a BOP (Blow Out Preventer) storage area is provided in the hull of the vessel below the upper deck, adjacent the moonpool, and wherein the non-active position of the drill floor allows the BOP to be positioned below the drill floor, above the moonpool, and wherein the hoisting device is adapted for raising and lowering the usually extremely heavy BOP to the seabed.

In a possible embodiment, the monohull offshore drilling vessel is also suitable for performing dual gradient drilling. In particular, this type of drilling requires a large and heavy mudlift pump to be installed on top of the BOP. Advantageously, on the vessel of the invention also equipment to perform dual gradient drilling is provided, in particular a mudlift pump. In this embodiment, the drill floor is mobile between the active position and an elevated non-active position, wherein the elevated non-active position of the drill floor allows both the mudlift pump and the BOP to which it is to be connected to be brought into the firing line above the moonpool and manipulated by the hoisting device. Furthermore, in this embodiment, the hoisting device is adapted for raising and lowering the BOP and the mudlift pump connected to the top of the BOP to the seabed. Advantageously, a mudlift pump storage area is provided adjacent the moonpool.

The vessel according to the invention comprises drilling equipment for performing auxiliary operations for the drilling or drilling related operations. Preferably, the vessel with its integrated drilling equipment is suitable for:
  exploration and production drilling operations
  coiled tubing operations
  installation of x-mas trees
  well testing
  completions.

The drilling equipment provided in the hull of the vessel below the upper deck preferably comprises one or more of:
  a pipe storage for storing drill pipes in a substantially horizontal position,
  a riser storage for storing risers in a substantially horizontal position,
  a BOP storage area for storing a BOP (Blow Out Preventer),
  a silo room for accommodating silos,
  a mud tank for storing drilling mud,
  a storage tank for storing fluids such as base oil or brine,
  a pump room for accommodating pumps such as mud pumps.

In a possible embodiment, a ventilation system is provided in the hull of the vessel, comprising ventilation intake shafts and ventilation exhaust shafts, which shafts open out at a level below the upper deck. Hence, in such an embodiment there are no ventilation shafts extending through the upper deck, which, i.e. ventilation shafts extending through the upper deck, is quite common. The lack of ventilation shafts extending through the upper deck further attributes to an increased clean deck area, which can thus be used for other purposes.

In an embodiment, the upper deck of the monohull offshore drilling vessel is provided with a grid of recesses, and the vessel further comprises one or more vertical elements. Each recess is adapted to receive a cooperating vertical element. Such a meccano-type grid on the flush upper deck increases the use options for the upper deck area. For example, a number of oppositely spaced vertical elements may form a rack, e.g. to store pipes or risers. It is also conceivable that marine, drilling and/or pipelay equipment, that is to be provided on the upper deck, is provided with vertical elements which can be received by the recesses. For example, a pipelay reel can be provided with projecting vertical pins.

To maintain a flush upper deck area, the recesses are provided below the uppermost upper deck level. Optionally, flanges are provided defining the recesses, which flanges are provided countersunk, such that the flange is flush with the upper deck.

Furthermore, for increase options of use of the vessel, preferably one or more cranes are provided, which are mounted onto, or formed integral with the upper deck.

A second aspect of the invention relates to a system for circulating drilling mud, wherein drilling mud is pumped down through the borehole and returned to the surface of the borehole, wherein the drilling mud that is returned to the surface is transferred to a combination of a shaker device and a mud-treatment unit in series, connected via a fluid connection.

In the drilling of oil and gas wells, whether offshore or onshore, rotary drilling techniques require the use of drilling mud circulated through the borehole during the drilling process. Typically, the drilling mud is pumped from a mud holding tank, through mud supply lines, down through the borehole and returned to the surface of the borehole. The circulating drilling mud, as it is returned to the surface of the borehole, is used to carry the drill cuttings produced from the bottom of the advancing borehole to the surface for disposal.

The drilling mud that is returned to the surface, along with the carried drill cuttings, is transferred to a shaker device (also called sieving device) that is utilized to remove the carried drill cuttings drilling mud. The drilling mud, absent the removed drill cuttings, is further treated in a mud-treatment unit, prior to being re-circulated to the borehole. The drill cuttings, removed by the shaker, are typically collected for further processing on the rig or to storage boxes or containers for treatment and disposal at a later time. The drilling mud may pass a transfer tank between the mud-treatment unit and the entry of the borehole.

It is noticed that in order to circulate the drilling mud in a system according to the invention, preferably pumps are provided in the system. In addition, various flows of drilling mud can also be achieved via gravity. Preferably, the drilling mud flows from the shaker device into and through the mud-treatment unit under the influence of gravity.

In the shaker device, the drill cuttings are removed. Typically, meshes and/or filters are provided. A shaker device possibly comprises multiple shakers, e.g. 2-4. In the mud-treatment unit the mud is cleaned further, e.g. by sand removal, gas removal, etc. A mud-treatment unit typically comprises various interconnected tanks, such as a sand trap, degasser tank, degasser clean tank, centrifuge tank and clean tank.

Such a shaker device and mud-treatment unit needs to be serviced regularly, for cleaning and/or replacement of meshes, filters, tanks etc. Servicing may also be required when a switch between oil based mud and water based mud is performed.

In prior art systems for circulating drilling mud, the entire drilling mud circulation needs to be stopped for the servicing of the shaker device and/or mud-treatment unit. Hence, during servicing no drilling operations can be performed.

The aim of the present invention is to improve the overall efficiency, by providing a system for circulating drilling mud, comprising a first shaker device and a first mud-treatment unit in series, connected via a first fluid connection; and a second shaker device and a second mud-treatment unit in series, connected via a second fluid connection, which second combination is provided in parallel with the first combination, allowing drilling mud that is returned to the surface to be transferred to either the first and/or the second combination.

Hence, two parallel mud cleaning lines are provided, increasing the overall capacity. In addition, according to the invention, a transverse fluid connection is provided between the first shaker device and the second mud-treatment unit. This transverse fluid connection allows drilling mud to be transferred from the first shaker device to the second mud-treatment unit.

As a result, a shaker device and/or mud-treatment unit can be switched off, while the other shaker device and/or mud-treatment unit remains operational. Accordingly, the continued circulation of drilling mud is ensured, during servicing of the switched off shaker device and/or mud treatment unit(s). An advantage of the system for circulating drilling mud according to the invention is thus that simultaneous servicing and drilling mud circulation is possible, as a result of which drilling operations can continue during cleaning. This is advantageous for the overall efficiency. In an embodiment, it is conceivable that the capacity of drilling mud circulation has to decrease during servicing, but advantageously the drilling mud circulation can continue at all.

In an embodiment, the transverse fluid connection is provided between the first and second fluid connections. Advantageously, a mud gutter is provided downstream of both the first and the second shaker device, which mud gutter forms the transverse fluid connection between the first and second fluid connections.

In an alternative embodiment, two transverse fluid connections are provided: between the first shaker device and the second mud-treatment unit, and between the second shaker device and the first mud-treatment unit. Possibly, from the first (or second) shaker device two fluid connections depart: one to the first (or second) mud-treatment unit and one to the second (or first) mud-treatment unit. Drilling mud from the first shaker device may be transferred to the first or second mud-treatment unit, as desired, while servicing the other. Drilling mud from the second shaker device may thus be transferred to the first or second mud-treatment unit, as desired, while servicing the other. Also, when transferring drilling mud to the first shaker device, the second shaker device and second mud-treatment unit may be used for circulation drilling mud as well. Thus, a system is provided allowing servicing of any of the first or second shaker devices and/or first or second mud-treatment units, while mud circulation continues via the other shaker device and mud-treatment unit.

In yet an alternative embodiment, the transverse fluid connection is formed by a shared portion of the first and second fluid connections. Hence, the fluid connection between first shaker unit and first mud-treatment unit, and the fluid connection between second shaker unit and second mud-treatment unit may be allowed to overlap at some portion, to allow mud from the first shaker device to flow to the second mud-treatment unit and mud from the second shaker device to flow to the first mud-treatment unit. This way also a system is provided allowing servicing of any of the first or second shaker devices and/or first or second mud-treatment units, while mud circulation continues via the other shaker device and mud-treatment unit.

In order to be able to service a shaker device and/or mud-treatment unit while drilling mud circulation continues, it is conceivable that additional valves, pumps and other equipment is installed in one or more of the fluid connections, the shaker device and/or the mud-treatment unit.

The second aspect of the invention also relates to a method wherein use is made of a system for circulating drilling mud, wherein drilling mud is pumped down through the borehole and returned to the surface of the borehole, wherein the drilling mud that is returned to the surface is transferred to a combination of a shaker device and a mud-treatment unit in series, connected via a fluid connection, wherein the system comprises:
- a first combination of a first shaker device and a first mud-treatment unit in series, connected via a first fluid connection; and
- a second combination of a second shaker device and a second mud-treatment unit in series, connected via a second fluid connection, which second combination is provided parallel with the first combination,
- a transverse fluid connection between the first combination and second combination.

Preferably, the method comprises the following steps:
- transferring the drilling mud that is returned to the surface to a first and/or second shaker device,
- transferring the drilling mud from the first and/or second shaker device via a first fluid connection, a second fluid connection and/or a transverse fluid connection to a first and/or a second mud-treatment unit,
- switching off and servicing at least one of the first and second shaker device and first and second mud-treatment unit, during the transfer of drilling mud from other of the first and/or second shaker device to the first and/or a second mud-treatment unit.

The system according to the invention not only allows the first or second combination of shaker device and mud-treatment unit to be switched off, but it is also conceivable that only one of the shaker devices or one of the mud-treatment devices is switched off. Yet alternatively, it is possible to switch off the first shaker device in combination with the second mud-treatment unit, or to switch off the second shaker device in combination with the first mud-treatment unit.

The system of the second aspect of the invention may be installed on a monohull offshore drilling vessel according to the first aspect of the invention.

The invention is further elucidated in relation to the drawings, in which:

FIG. 1b represents a cross-sectional side view of the embodiment of the vessel of FIG. 1a;

FIG. 1c represents a top view of the embodiment of the vessel of FIG. 1a;

Figure 1A:
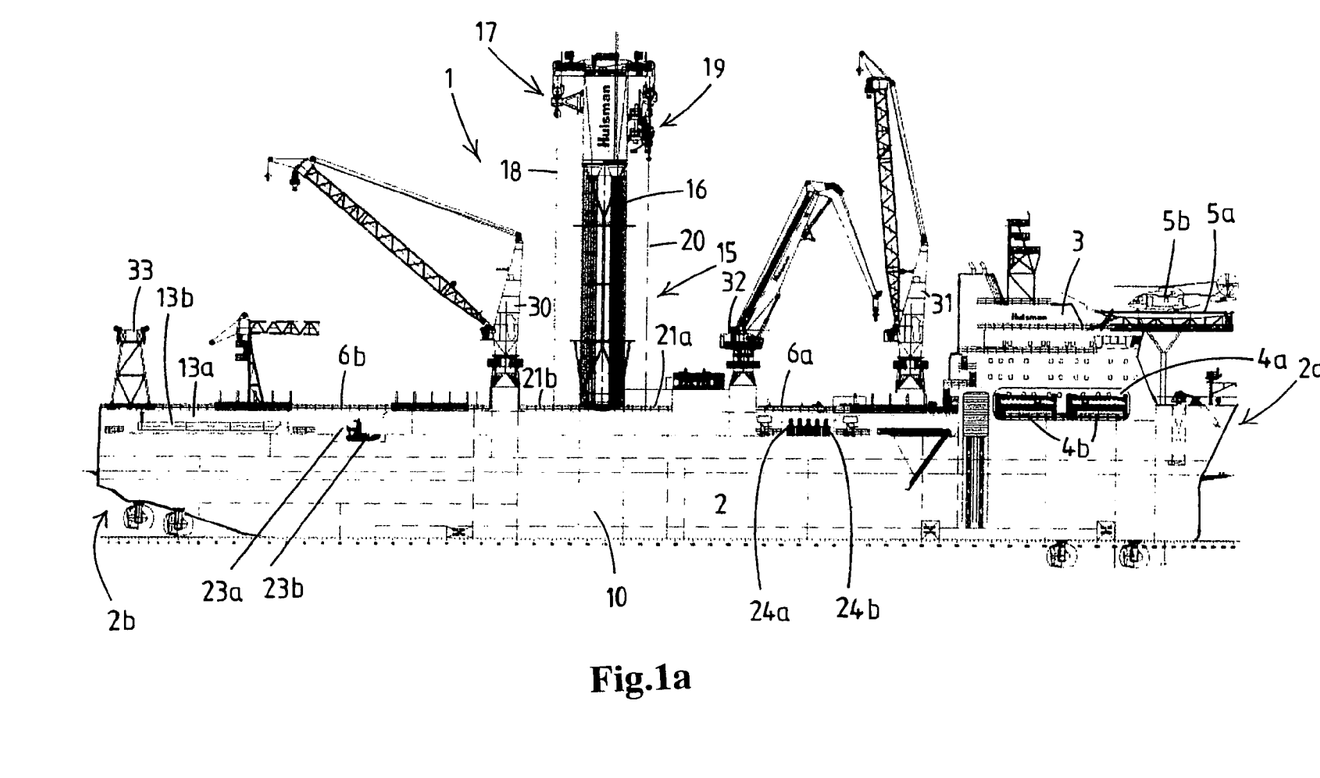
FIG. 1a represents a side view of an embodiment of a monohull offshore drilling vessel according to a first aspect of the invention.
Figure 1B:
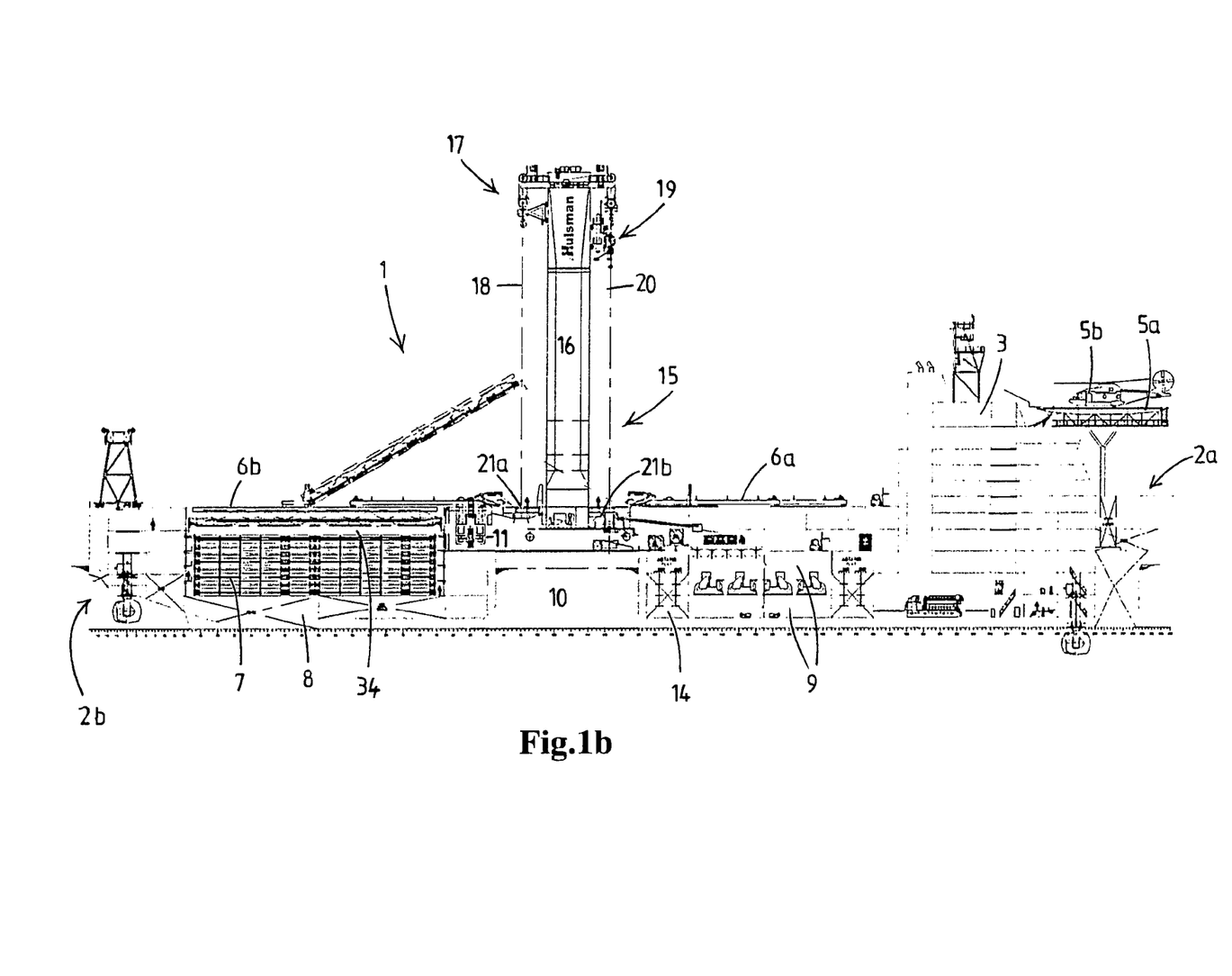
Figure 1C:
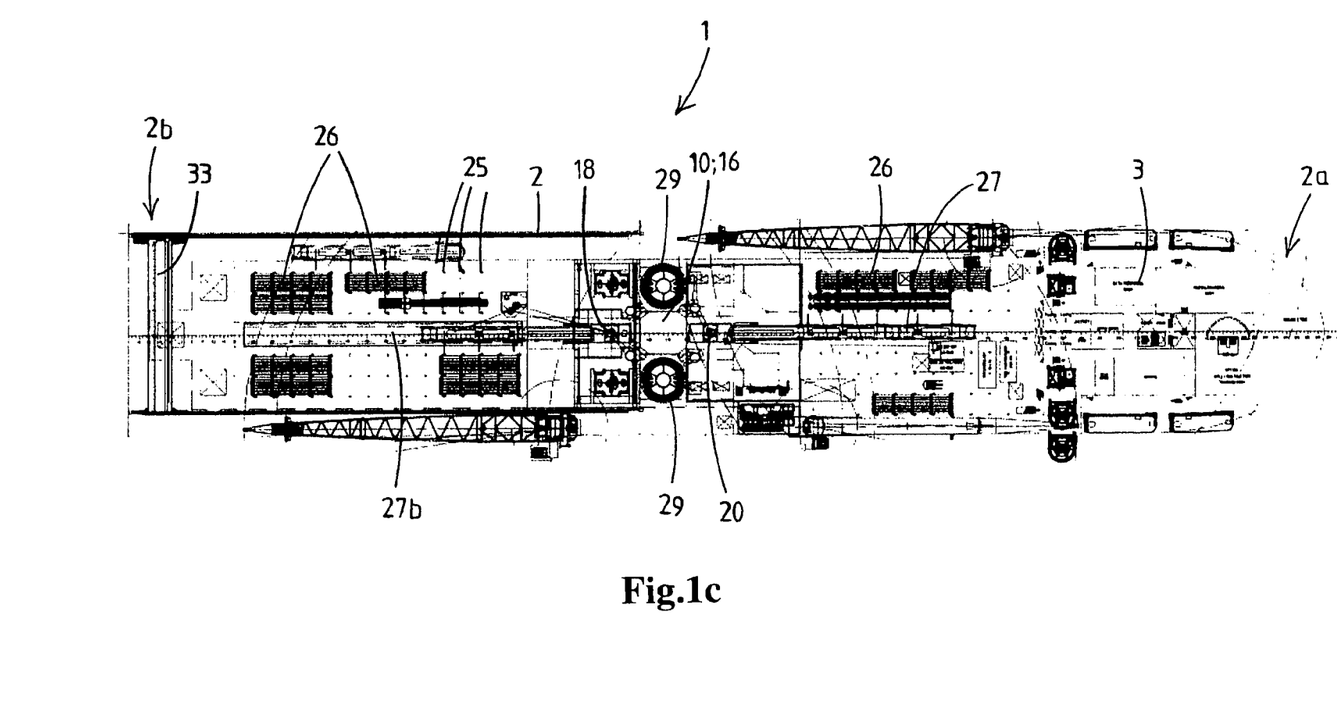
Figure 2A:
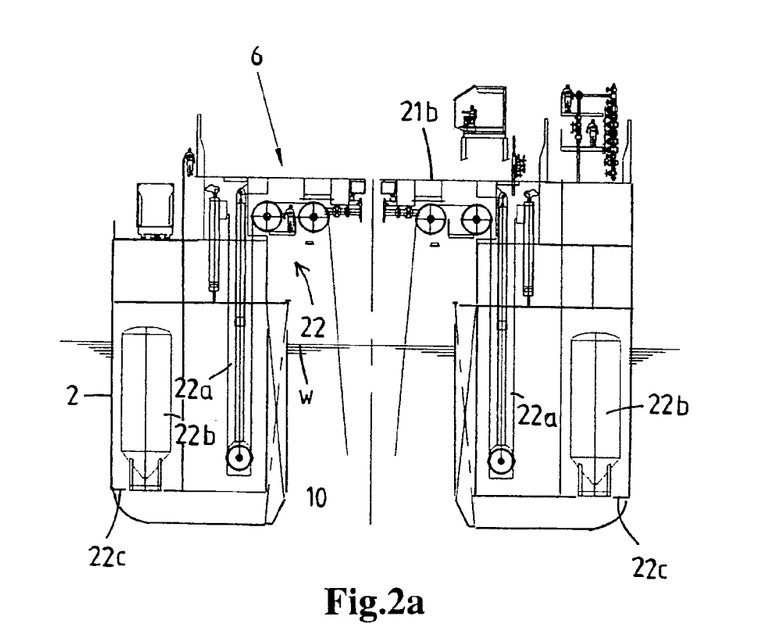
FIGS. 2a and 2b represent transverse cross-sections of the embodiment of the vessel of FIGS. 1a-1c, FIGS. 3a and b represent a top and partial cross-sectional side view of an embodiment of a monohull offshore drilling vessel according to the first aspect of the invention, which is suitable for performing pipelaying operations.
Figure 2B:
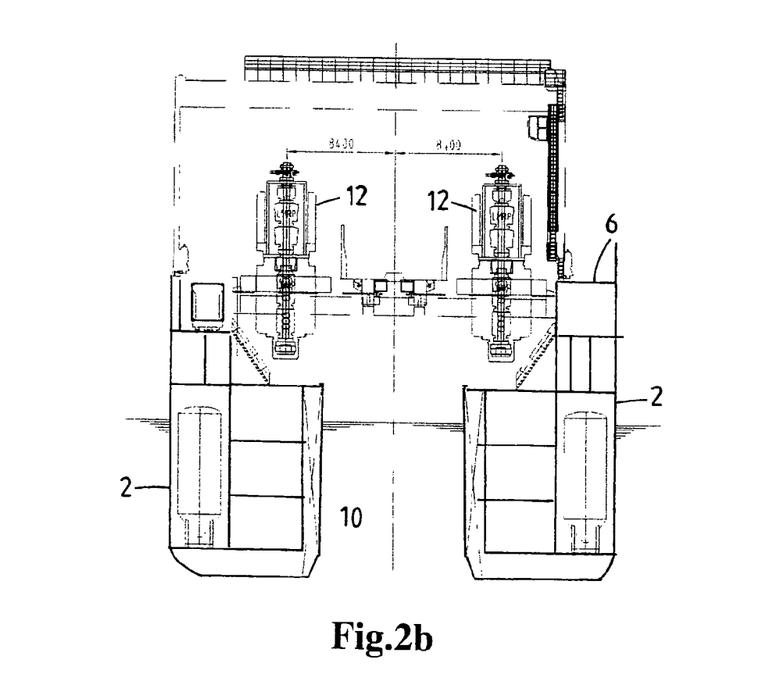

In FIGS. 1a, 1b, 1c, 2a and 2b an embodiment of a monohull offshore drilling vessel 1 according to a first aspect of the invention is shown. In FIG. 1a, a side view is visible, while in FIG. 1b a cross-section of the vessel, in a similar side view is visible. In FIG. 1c a top view is shown, while FIGS. 2a and 2b represent two different cross-sections traverse to the longitudinal axis of the vessel, in the vicinity of the moonpool of the vessel.

The shown monohull offshore drilling vessel 1 comprises a hull 2 having a bow 2a and a stern 2b. On the hull 2 at the bow 2a an accommodation topside is provided, generally indicated with reference number 3. The accommodation topside comprises at least crew quarters and a bridge, and optionally a hospital, medic office, cinema room, data monitoring room, coffee corner, smoking area, sauna etc. etc. At the bow 2a, also a helicopter platform 5a is provided, for a helicopter 5b.

At a lateral side of the hull 2 of the vessel, here the starboard side of the vessel, a recessed storage area 4a is provided, here used for the storage of lifeboats 4b. At the lateral side of the hull, more of this type of storage areas are preferably provided, to store equipment such that it does not project beyond the plane of the lateral side of the hull of the vessel, while remaining easily accessible, as is a prerequisite for lifeboats 4b.

The hull 2 has an upper deck 6 between the accommodation topside 3 and the stern 2b of the vessel. The vessel 1 comprises a moonpool 10 extending through the hull 2, here in a midsection of the upper deck 6, wherein a front upper deck portion 6a of the upper deck extends forward of the moonpool 10 and a rear upper deck portion 6b of the upper deck extends rearward of the moonpool 10. The upper deck is the uppermost deck, covering the hull. Inside the hull multiple other decks can be provided, frequently referred to as 'tween' decks.

According to the first aspect of the invention, most of the drilling and/or marine equipment is provided in the hull of the vessel below the upper deck. In particular, drilling equipment that is stored below the upper deck comprises one or more of:
  a pipe storage for storing drill pipes in a substantially horizontal position,
  a riser storage 7 for storing risers in a substantially horizontal position,
  a BOP storage area for storing a BOP (Blow Out Preventer); in the shown embodiment two BOP's 12 are visible in FIG. 2b,
  a mudlift pump (MLP) 11,
  a silo room for accommodating silos,
  a mud tank 14 for storing drilling mud,
  a storage tank for storing fluids such as base oil or brine,
  pump rooms 9 for accommodating pumps such as mud pumps,
  burner booms 13b.

Furthermore, as visible in FIG. 1b, water ballast tanks 8 may also be provided inside the hull 2, close to a floor of the hold.

As visible in FIG. 1a, at the starboard lateral side of the hull 2 of the vessel, another recessed storage area 23a is provided, here used for the storage of a fastboat 23b. The fastboat 23b is stored such that it does not project beyond the plane of the lateral side of the hull of the vessel, while remaining easily accessible.

Also, storage area 13a is proved for the storage of a burner boom 13b, such that the stored burner boom 13b does not project beyond the plane of the lateral side of the hull of the vessel. Burner booms are common on drilling vessels to allow for the flaring of hydrocarbon products when desired. The vessel preferably has two pivotal burner booms 13b, each burner boom having an inner portion pivotally mounted at a lateral side of the hull and an outer portion of the boom supporting one or more burners. Each burner boom is pivotable between a storage position generally parallel to the lateral side of the hull and an operative position wherein the boom is directed away from the hull 2, preferably the burner being beyond the stern of the vessel so that the flare is remote from the upper deck 6.

According to the preferred feature each burner boom is stored in the storage position at a height lower than the level of the upper deck 6, the burner boom most preferably being located in a rear section of the lateral side of the hull, so generally below the level of the rear upper deck portion 6b. Hereby no deck space is required for the burner booms and the burner booms (in storage position) do not obstruct activities such as placing items on the rear deck portion with a crane.

Most preferably, as in the vessel 1, the lateral side of the hull has a recessed storage space 13a for the burner boom 13b, such that the stored burner boom does not project beyond the plane of the lateral side of the hull of the vessel. Hereby the burner boom is effectively hidden within the hull of the vessel and is shielded from damage. In addition the burner boom does not hinder other activities on the vessel. Possibly the burner boom is a cantilever boom, that is solely supported at its inner portion which is pivotally mounted to the hull via a pivot structure supporting the entire weight of the boom.

Also visible in FIG. 1a is a recessed area 24a, which is used for providing transfer hoses 24b. Similar to the lifeboats 4b and fastboat 23b, the transfer hoses 24b are stored such that they do not project beyond the plane of the lateral side of the hull of the vessel, while remaining easily accessible. Other than the recessed storage areas of the lifeboats 4a and fastboat 23a, this transfer hose storage area 24a is not covered by the upper deck. Hence, at the location of the transfer hose storage area 24a the upper deck 6a does not extend over the entire width of the hull, but comprises a recess. The transfer hoses are e.g. suitable to transfer oil, drill water, brine, potable water, liquid mud, bulk mud, drill cuttings etc. etc.

On the hull 2 a firing line hoist system 15 is mounted, which firing line hoist system 15 comprises a mast 16, which is connected to the hull 2 at the moonpool 10 of the drilling vessel 1. The firing line hoist system 15 of the shown embodiment is a dual firing line hoist system, but it is also conceivable that a single or alternatively multiple (over 2)

firing line hoist system is provided. A first hoisting device 17 is supported by the mast and has a load attachment device displaceable along a first firing line 18, which extends on the outside of and adjacent to a first firing line side of the mast, at the stern side of the vessel, and which firing line extends through the moonpool 10. A second hoisting device is supported by the mast and has a load attachment device displaceable along a second firing line 20, which extends on the outside of and adjacent to a second firing line side of the mast, at the bow side of the vessel, opposite the first firing line side of the mast, and which firing line 20 also extends through the moonpool 10. As is preferred, both hoisting devices 17, 19 are adapted to be used for drilling or drilling related operations.

It is envisaged that the vessel 1 has drilling stations at the front and rear side of the mast 16. The drilling stations include a drilling deck or drill floor above the front moonpool area. At the first firing line 18 side of the mast, i.e. at the stern side of the vessel, a drill floor 21b is provided, which covers a stern side portion of the moonpool 10 while the firing line 18 extends through an opening in said drill floor 21b. At the second firing line 20 side of the mast, i.e. the bow side of the vessel, a drill floor 21 a is provided, which covers a bow side portion of the moonpool 10, while firing line 20 extends through an opening in said drill floor 21. The drilling deck may be a stationary deck or alternatively mobile. As indicated, the drill floor has an opening for the passage of tubulars, including a telescopic joint, that can be raised and lowered with the hoisting device. The drill floor may be provided with a rotary table and an iron roughneck, as is preferred.

According to the first aspect of the invention, the drill floor 21a, 21b is flush with the upper deck 6b, 6a. In particular, both drill floors 21a, 21b, the front upper deck portion 6a and the rear upper deck portion 6b are flush with each other, i.e. they all extend at the same level.

A riser-tensioner 22, visible in FIG. 2a, is provided for exerting a tensile force from the drilling vessel 1 upon a riser, which riser-tensioner 22 is provided below the drilling floor 21b. Here, the riser tensioner system comprises multiple, here 8, wire line type riser tensioners. The riser tensioner cylinders 22a are mounted vertical, under the drill floor, inside the hull. The pressure vessel units 22b are mounted next to the moonpool 10 on a tween deck 22c. It is noted that the dimensions of this riser-tensioner 22, in particular the portion of the riser tensioner provided in the moonpool, above the water level W, determines the level of the drill floor above the moonpool 10. In addition to the height of this portion of the riser-tensioner, also the decay require for mud-treatment contributes to determine the required drill floor level, which in this embodiment equals the upper deck level.

It is preferred that the drilling deck is provided with a riser suspension device, e.g. a riser spider, allowing to suspend a riser string, most preferably with a BOP attached to the lower end of the riser string, from the deck.

From the top view of FIG. 1c, it is evident that the entire upper deck 6a, 6b is provided with a grid of recesses 25, which are provided such that the upper deck remains flush. According to an embodiment of the invention, each recess 25 is suitable for receiving a cooperating vertical element. In the embodiment shown in this drawing a number of racks 26 is installed on the rear and front upper deck portion 6b, 6a. Advantageously, the racks 26 are formed by a number of oppositely spaced vertical elements, received in the recesses 25. The vertical elements are e.g. poles or fences, which are arranged from a rack, e.g. to store pipes or risers. In an embodiment, not shown, flanges are provided defining the recesses, which flanges are provided countersunk, such that the flange is flush with the upper deck 6a, 6b.

The vessel 1 is furthermore provided with various cranes, which are provided on, and mounted to the upper deck. In the embodiment of FIGS. 1 and 2, a pedestal crane 30 is mounted just aft of the firing line hoist system 15. This crane 30 is e.g. utilized for offloading supply boats, general deck handling and can be utilized to hoist off the top of the mast 16 for bridge passage. This top of the mast may be stored on the upper deck. A second pedestal crane 31 is in this embodiment provided just aft of the accommodation 3. This crane 31 may be utilized for offloading supply boats and general deck handling. A pipe handling knuckle boom crane 32 is mounted forward of the mast 16, adjacent a catwalk device 27. Catwalk machine 27a is arranged on the front upper deck 6a in longitudinal direction to feed tubulars, e.g. drill pipes into the front firing line 20. On the rear upper deck 6b a catwalk device 27b is arranged in longitudinal direction to feed tubulars, e.g. drill pipes into the rear firing line 18. The pipe handling knuckle boom crane 32 is utilized for loading tubulars on the forward catwalk device 27. In the shown embodiment, a gantry crane 33 is mounted on the rear upper deck portion 6b. The gantry crane 33 can preferably cover the complete aft upper deck portion 6b and can travel up to the aft side of the mast 16, here the first firing line side 18 of the firing line hoist system 15. The gantry crane 33 can be utilized for loading tubulars on an aft catwalk machine 27b, riser handling and general deck handling. In the riser storage 7, an overhead crane 34 may be provided.

Two set-backs, here carrousels, 29 for vertical storage of drill pipe joints, for example quad joints of about 40 meters, are arranged at opposed lateral sides of the mast 16.

Figures 3A, 3B:
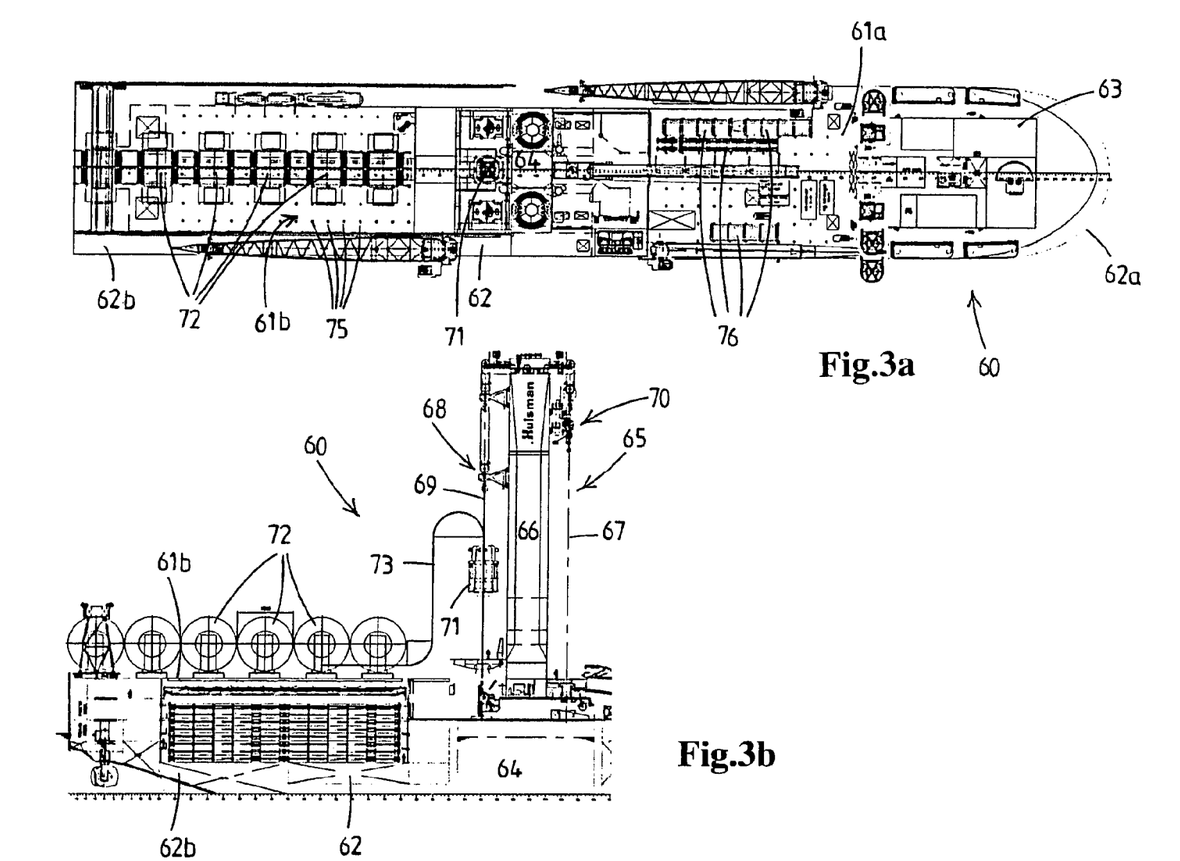

In FIGS. 3a and 3b an embodiment of a monohull offshore drilling vessel 60 according to the first aspect of the invention is shown, which embodiment is suitable for performing pipelaying operations. In FIG. 3a a top view of the vessel, of the entire upper deck 61 is visible, while in FIG. 3b only a portion of a side view of the vessel 60 is shown.

Monohull offshore drilling vessel 60 comprises a hull 62 with a bow 62a and a stern 62b. On the bow 62a of the hull, an accommodation topside is provided, generally indicated with reference number 63, comprising crew quarters and a bridge.

A moonpool 64 extends through the hull. The hull has an upper deck 61, extending between the accommodation topside 63 and the stern 62b of the vessel. In the drawing, a front upper deck portion 61a of the upper deck is visible, extending forward of the moonpool 64 and a rear upper deck portion 61b of the upper deck, extending rearward of the moonpool 64.

On the hull, at the moonpool 64 a dual firing line hoist system 65 is mounted, which firing line hoist system 65 comprises a mast 66, which is connected to the hull at the moonpool 64 of the drilling vessel 60. The dual firing line hoist system 65 comprises a first hoisting device 68 supported by the mast and having a load attachment device displaceable along a firing line 69, which extends on the outside of and adjacent to a first firing line side of the mast, and which firing line extends through the moonpool 64, wherein the hoisting device is adapted to be used for drilling or drilling related operations. The dual firing line hoist system 65 further comprises a second hoisting device 70 supported by the mast and having a load attachment device displaceable along a firing line 67, which extends on the outside of and adjacent to a second firing line side of the mast, and which firing line extends through the moonpool 64, wherein the hoisting device is adapted to be used for drilling or drilling related operations In the shown embodiment, pipelay equipment is provided, in particular a tensioner 71, which is adapted to be installed in the firing line, here mounted at the first firing line side of the mast, which is used in the shown set-up for performing flexible pipelaying. In addition, the upper deck comprises a storage area for storage reels for pipes. In the shown embodiment, a number of reels 72 comprising flexible pipelines 73 are installed on the upper deck 61, in particular the rear upper deck portion 61*b*.

From the view from above in FIG. 3*a*, it is evident that the entire upper deck 61*a*, 61*b* is provided with a grid of recesses 75, which are provided such that the upper deck remains flush. According to an embodiment of the invention, each recess is suitable for receiving a cooperating vertical element. In the embodiment shown in this drawing a number of reels 72 is mounted on the rear upper deck portion 61*b*. Advantageously, the reels 72 are provided with vertical elements (not visible) which are suitable to be received into the recesses 75 provided on the upper deck 61*b*, to facilitate the mounting of the reels. In the shown embodiment, racks 76 are installed on the front upper deck portion 61*a*. Advantageously, the racks 76 are formed by a number of oppositely spaced vertical elements, such as poles, which together from a rack, e.g. to store pipes or risers. In an embodiment, not shown, flanges are provided defining the recesses, which flanges are provided countersunk, such that the flange is flush with the upper deck 61.

The advantage of an easy accessible firing line and a large free deck area results in the ability to provide all the required pipelaying equipment on the offshore drilling vessel, which further expands the options for use of the monohull offshore drilling vessel according to the present invention.

Figure 4:
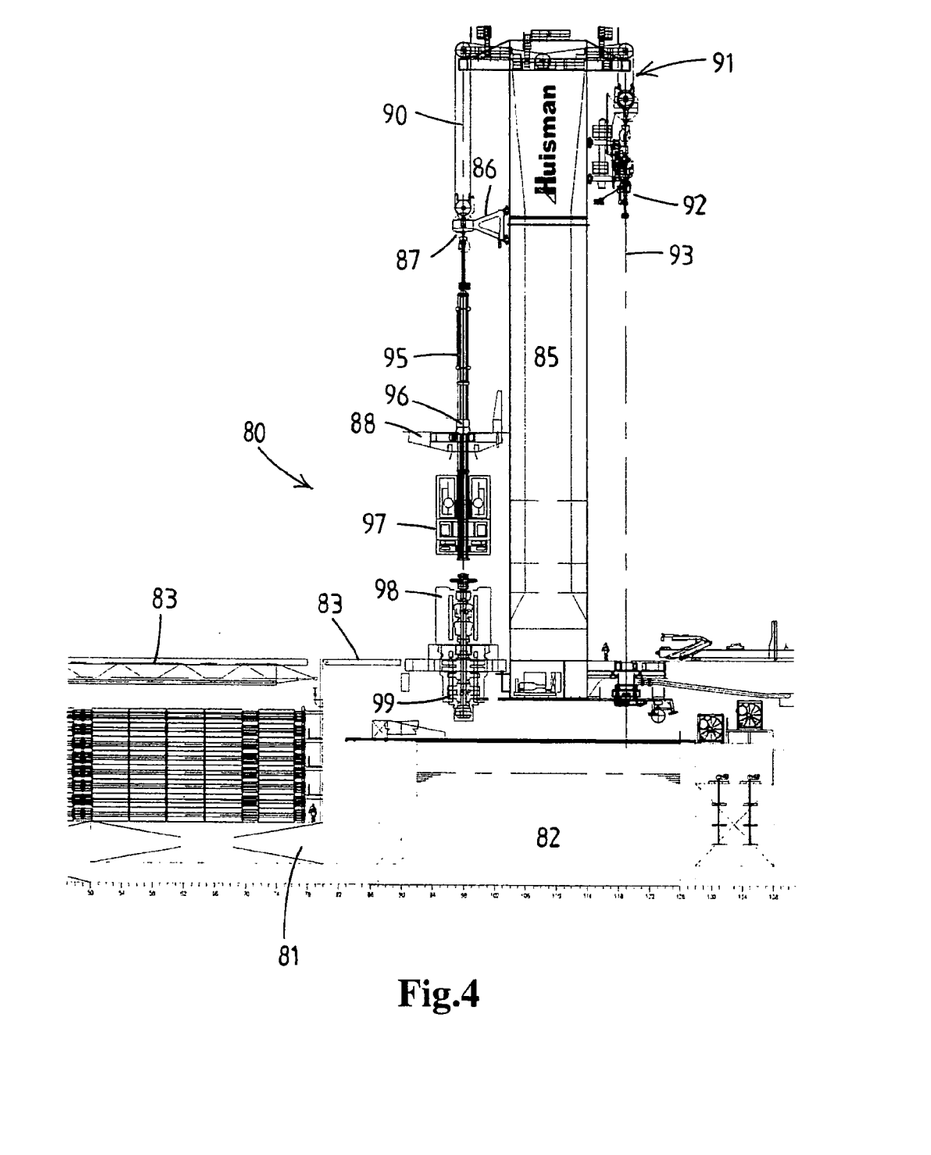
FIG. 4 represents a cross-sectional partial side view an embodiment of a monohull offshore drilling vessel according to the first aspect of the invention, which is suitable for performing dual gradient drilling.

FIG. 4 represents a cross-sectional partial side view an embodiment of a monohull offshore drilling vessel according to the first aspect of the invention, which is suitable for performing dual gradient drilling. In the drawing, part of the hull 81 is visible, and the moonpool 82 extending through the hull 81. The hull comprises an upper deck 83. A mast 85 is connected to the hull 81 at the moonpool 82 of the vessel. Mast 85 is part of a multiple firing line hoist system, comprising a first hoisting device 86 supported by the mast and having a first load attachment device 87 displaceable along a first firing line 90, which extends on the outside of and adjacent to the first side of the mast, and a second hoisting device 91 supported by the mast and having a second load attachment device 92 displaceable along a second firing line 93, which extends on the outside of and adjacent to the second side of the mast. The first and second hoisting devices 86, 91 each include one or more cables and one or more associated winches, the winches (not visible) being disposed in the hollow construction of the mast, to manipulate the position of each of the load attachment devices relative to the mast.

A mobile drill floor 88 is provided at the first firing line 90 side of the mast. In an active position, not shown, the drill floor is flush with the upper deck 83 and covers a portion of the moonpool 82 while the firing line extends through an opening in said drill floor 88. In the drawing, the drill floor 88 has moved to a non-active position allowing equipment to be brought into the firing line 90 above the moonpool 82 and manipulated by the first hoisting device 86.

In particular, in the drawing, the mobile drill floor 88 has moved to an elevated level, wherein hoisting device 86 is about to lower the ensemble of subsea rotating device (SRD) 95, solids processing unit (SPU) 96, mudlift pump (MLP) 97 and BOP, here composed of lower marine riser package (LMRP) 98 and lower blow out preventer (LBOP) 99. It is noted that in the drawing, the entire ensemble of SRD 95, SPU 96, MLP 97, LMRP 98 and LBOP 99 is positioned above the moonpool. The advantage of a mobile drill floor and of an easy accessible firing line results in the ability to provide such a large ensemble of equipment in the firing line, above the moonpool and below the drill floor, which expands the options for use of the monohull offshore drilling vessel according to the present invention.

Figure 5:
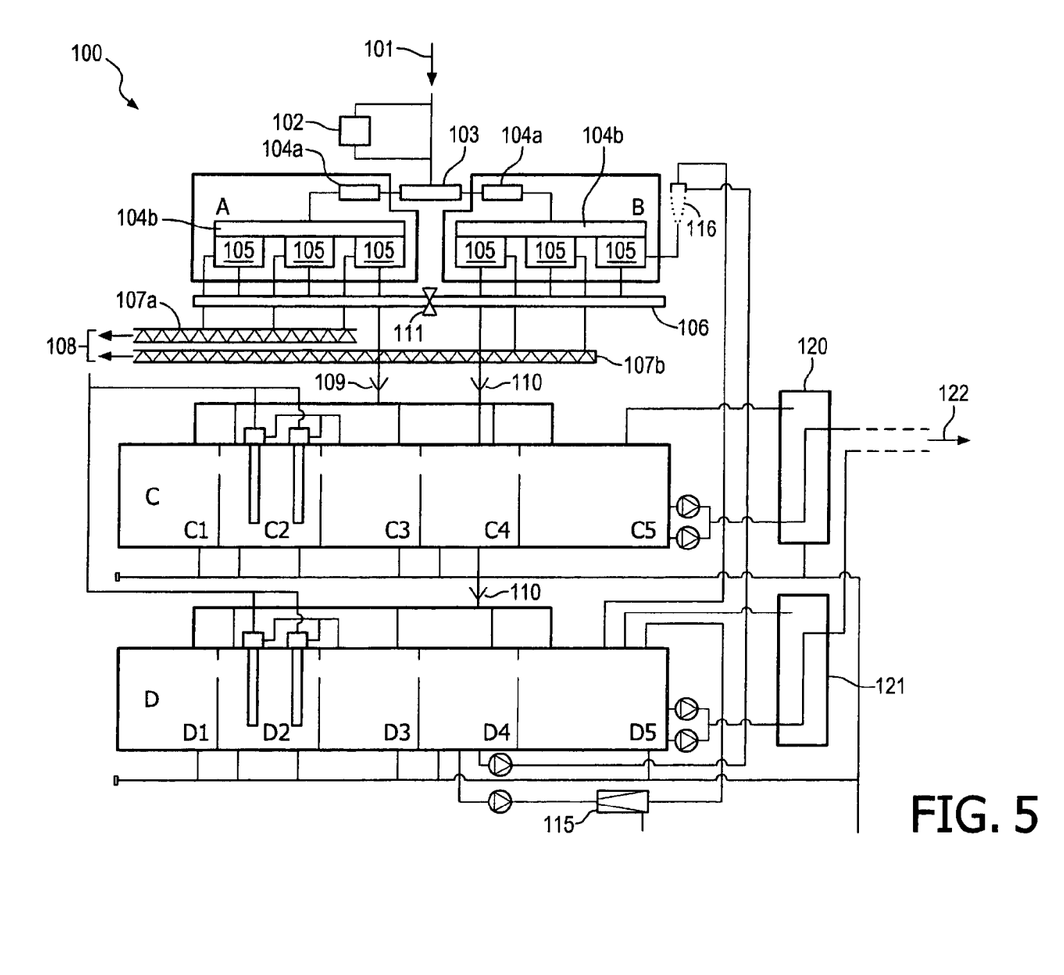
FIG. 5 represents a schematic flow diagram representing a portion of a system for circulating drilling mud according to the second aspect of the invention.

In FIG. 5 a system 100 for circulating drilling mud according to the second aspect of the invention is schematically shown. Drilling mud returning to the surface of the borehole is indicated with arrow 101 at the upper portion of the drawing. Possibly, this drilling mud has passed a diverter. A so-called swarf unit 102 is shown, through which the drilling mud optionally circulates for the swarf removal. Via a flow divider 103, the drilling mud is allowed to pass magnets 104*a*, for the removal of metal parts. Subsequently, via a header box 104*b*, the drilling mud is transferred to shakers 105. In the shown embodiment, the shaker devices are schematically indicated with reference letters A and B. It is evident that in the shown embodiment, each shaker device comprises a magnet 104*a*, a header box 104*b* and three shakers 105. Another number of shakers is also conceivable.

In the shown embodiment, an optional desander desilter installation 116 is provided adjacent the second shaker device B.

In the shaker devices A and B, mud and cuttings are being separated. The cuttings from shaker device A are led to cuttings auger 107*a*, while cuttings from shaker device B are transferred to cuttings auger 107*b*. From the cuttings auger 107*a, b*, the cuttings are transferred to a cuttings handler 108.

Drilling mud from the first shaker device is transferred to first mud-treatment unit C, provided in series, via first fluid connection 109. Drilling mud from the second shaker device B is transferred to second mud-treatment unit D, provided in series, via second fluid connection 110. The second combination of shaker device C and mud-treatment unit D is provided parallel with the first combination of shaker device A and mud-treatment unit C.

Drilling mud from both the first shaker device A and the second shaker device C is let to mud gutter 106. This mud gutter 106 forms a transverse fluid connection between the first combination A, C and second combination B, D. This mud gutter 106 allows drilling mud to be transferred from the first shaker device A to the second mud-treatment unit D, and/or from the second shaker device B to the first mud-treatment unit C. A valve 111 is provided to direct the mud flow as desired. As a result, a shaker device A, B and/or mud-treatment unit C, D can be switched off, while the other shaker device and/or mud-treatment unit remains operational.

Both the mud-treatment units C, D, comprise multiple tanks: sand trap C1, D1, degasser tank C2, D2, degasser clean tank C3, D3, centrifuge tank C4, D4 and clean tank C5, D5. An optional additional centrifuge 115 is in the shown embodiment connected to centrifuge tank D4.

Drilling mud from unit C is transferred via transfer tank 120 back to the borehole 122, and drilling mud from unit D is transferred via transfer tank 121 to the borehole 122.

Figure 6A:
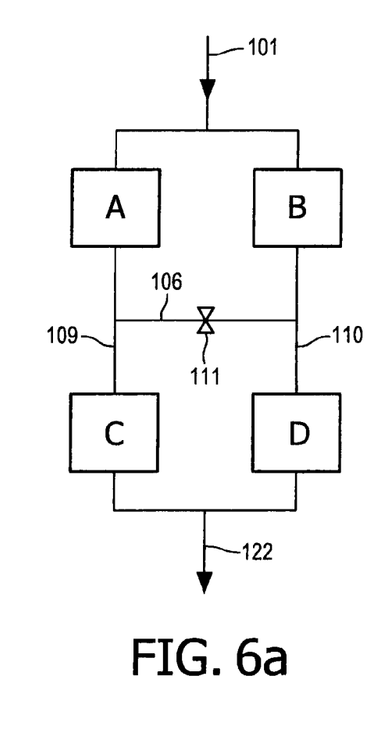
FIGS. 6a, b and c represent three different embodiments of a transverse fluid connection according to the second aspect of the invention.
Figure 6B:
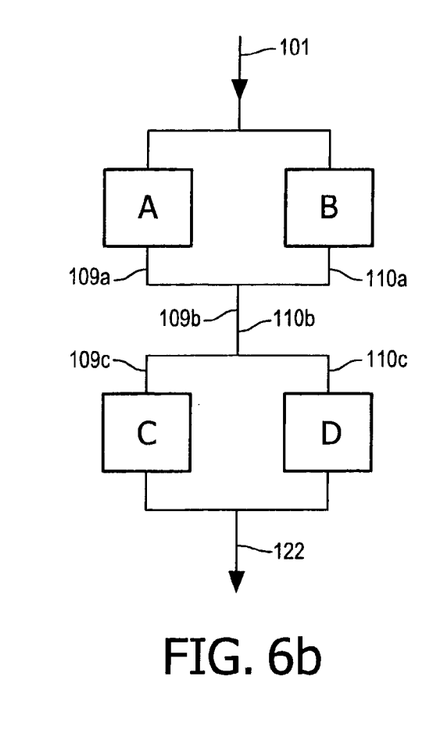
Figure 6C:
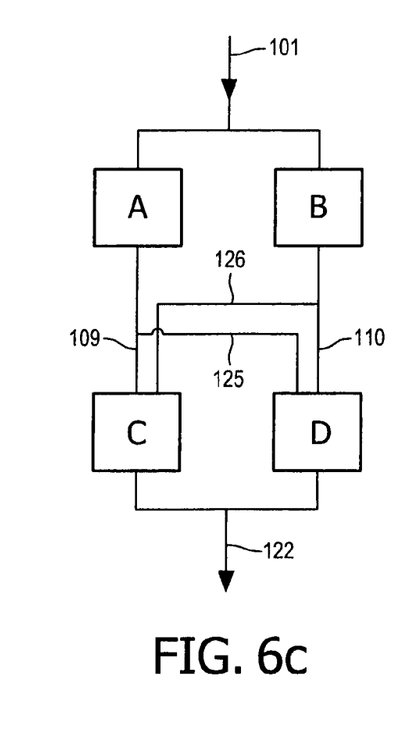

In FIGS. 6 *a, b* and *c*, three different embodiments of a transverse fluid connection between the first combination and second combination are schematically indicated. All three embodiments disclose a transverse fluid connection according to the invention, allowing drilling mud to be transferred from the first shaker device to the second mud-treatment unit, and/or from the second shaker device to the first mud-treatment unit. As a result, a shaker device and/or mud-treatment unit can be switched off, while the other shaker device and/or mud-treatment unit remains operational to allow drilling mud to circulate and drilling operations to continue.

In all embodiments, drilling mud enters the system with flow 101 and exits the system via flow 122. The mud may pass a first combination of first shaker device A and first mud-treatment unit C in series, which are connected via fluid connection 109. Alternatively or in addition, the mud may pass a second combination of second shaker device B and second mud-treatment unit D in series, which are connected via fluid connection 110.

In FIG. 6a the embodiment of FIG. xxx is schematically shown: a transverse fluid connection 106, comprising a valve 111, is provided between the first fluid connection 109 and the second fluid connection 110.

In FIG. 6b an alternative embodiment is schematically shown. The mud passes through a first combination of first shaker device A and first mud-treatment unit C via fluid connection 109a,j 109b, 109c. The mud passes the second combination of second shaker device B and second mud-treatment unit D via fluid connection 110a, 110b, 110c. The transverse fluid connection is formed by a shared portion 109b, 110b of the first and second fluid connections.

In FIG. 6c yet an alternative embodiment of a system according to the invention is schematically shown. The mud passes through a first combination of first shaker device A and first mud-treatment unit C via fluid connection 109. The mud passes the second combination of second shaker device B and second mud-treatment unit D via fluid connection 110. According to the invention, a transverse fluid connection 125 is provided between the first shaker device A and the second mud-treatment unit D. In addition, in the shown embodiment, another transverse fluid connection 126 is provided between the second shaker device B and the first mud-treatment unit D.

The invention claimed is:

1. A monohull offshore drilling vessel comprising:
a hull with a bow and a stern and a moonpool extending through the hull;
an accommodation topside having crew quarters and a bridge, said accommodation topside being arranged on the hull at the bow;
the hull having an upper deck extending from the accommodation topside to the stern of the vessel;
a firing line hoist system that is mounted on the hull at said moonpool, the firing line hoist system comprising a mast, which is connected to the hull at the moonpool of the drilling vessel;
a hoisting device supported by the mast, having a load attachment device displaceable along a firing line, which extends on the outside of and adjacent to a firing line side of the mast, and the firing line extends through the moonpool, wherein the hoisting device is adapted to be used for drilling or drilling related operations, the hoisting device includes one or more cables and one or more associated winches to manipulate the position of the load attachment device relative to the mast;
a drill floor provided at the firing line side of the mast, which covers a portion of the moonpool while the firing line extends through an opening in said drill floor;
a riser-tensioner for exerting a tensile force from the drilling vessel upon a riser, wherein the riser-tensioner is provided below the drill floor;
and
drilling equipment for performing auxiliary operations for the drilling or drilling related operations, wherein the drilling equipment comprises one or more of:
a pipe storage for storing drill pipes in a substantially horizontal position,
a riser storage for storing risers in a substantially horizontal position,
a BOP storage area for storing a BOP (Blow Out Preventer),
a silo room for accommodating silos,
a mud tank for storing drilling mud,
a storage tank for storing fluids,
a pump room for accommodating pumps, and
burner booms,
wherein the drill floor is flush with the upper deck, and the drilling equipment and marine equipment are provided in the hull of the vessel below the upper deck.

2. The monohull offshore drilling vessel according to claim 1, wherein a lateral side of the hull of the vessel, below the upper deck, is provided with one or more recessed storage areas for the storage of equipment, such that the stored equipment does not project beyond the plane of the lateral side of the hull of the vessel.

3. The monohull offshore drilling vessel according to claim 1, wherein the drill floor is mobile between an active position in which it is flush with the upper deck and covers a portion of the moonpool at said firing line side of the mast while the firing line extends through the opening in said drill floor, and a non-active position of the drill floor, allowing equipment to be brought in the firing line above the moonpool and manipulated by the hoisting device.

4. The monohull offshore drilling vessel according to claim 3, wherein the BOP (Blow Out Preventer) storage area is provided in the hull of the vessel below the upper deck, adjacent the moonpool, and wherein the non-active position of the drill floor allows the BOP to be positioned below the drill floor, and wherein the hoisting device is adapted for raising and lowering the BOP to the seabed.

5. The monohull offshore drilling vessel according to claim 4, wherein equipment to perform dual gradient drilling is provided, and wherein the hoisting device is adapted for raising and lowering the BOP and the equipment connected to the top of the BOP to the seabed, and wherein the drill floor is mobile between the active position and the non-active position which is elevated, wherein the elevated non-active position of the drill floor allows both the equipment and the BOP to which it is to be connected to be brought into the firing line above the moonpool and manipulated by the hoisting device.

6. The monohull offshore drilling vessel according to claim 1, wherein a ventilation system is provided in the hull of the vessel, comprising ventilation intake shafts and ventilation exhaust shafts,
wherein the ventilation intake shafts and the ventilation exhaust shafts open out at a level below the upper deck.

7. The monohull offshore drilling vessel according to claim 1, wherein the upper deck is provided with a grid of recesses, the vessel further comprising one or more vertical elements, and wherein each recess is adapted to receive a cooperating vertical element.

8. The monohull offshore drilling vessel according to claim 7, wherein flanges are provided defining the recesses, the flanges are provided countersunk, such that the flanges are flush with the upper deck.

9. The monohull offshore drilling vessel according to claim 1, further comprising pipelay equipment, wherein the upper deck comprises a storage area for storage reels for pipes, and wherein the pipelay equipment is adapted to be installed in the firing line, such that the offshore drilling vessel is adapted to be used for pipelay operations.

10. The monohull offshore drilling vessel according to claim 1, wherein the firing line hoist system is a multiple firing line hoist system comprising:
a first hoisting device supported by the mast and having a first load attachment device displaceable along a first firing line, which extends on the outside of and adjacent to a first firing line side of the mast; and
a second hoisting device supported by the mast and having a second load attachment device displaceable along a second firing line, which extends on the outside of and adjacent to a second firing line side of the mast, wherein the first firing line side of the mast is opposite the second firing line side of the mast.

11. The monohull offshore drilling vessel according to claim 1, wherein the vessel further comprises one or more cranes, which are mounted to the upper deck.

12. A method for circulating drilling mud, comprising a step of using the system according to claim 1.

13. The method according to claim 12, further comprising the steps of:
pumping down drilling mud through a borehole;
returning drilling mud to the surface of the borehole;
transferring the drilling mud that is returned to the surface to a first and/or second shaker device;
transferring the drilling mud from the first and/or second shaker device via a first fluid connection, a second fluid connection and/or a transverse fluid connection to a first and/or a second mud-treatment unit; and
switching off and servicing at least one of the first and second shaker device and first and second mud-treatment unit, during the transfer of drilling mud from other of the first and/or second shaker device to the first and/or a second mud-treatment unit.

14. The monohull offshore drilling vessel according to claim 4, wherein a mudlift pump to perform dual gradient drilling is provided, and wherein the hoisting device is adapted for raising and lowering the BOP and the mudlift pump connected to the top of the BOP to the seabed, and wherein the drill floor is mobile between the active position and the non-active position which is elevated, wherein the elevated non-active position of the drill floor allows both the mudlift pump and the BOP to which it is to be connected to be brought into the firing line above the moonpool and manipulated by the hoisting device.

15. A monohull offshore drilling vessel comprising:
a hull with a bow and a stern and a moonpool extending through the hull;
an accommodation topside having crew quarters and a bridge, said accommodation topside being arranged on the hull at the bow;
the hull having an upper deck extending from the accommodation topside to the stern of the vessel;
a firing line hoist system that is mounted on the hull at said moonpool, the firing line hoist system comprising a mast, which is connected to the hull at the moonpool of the drilling vessel;
a hoisting device supported by the mast, having a load attachment device displaceable along a firing line, which extends on the outside of and adjacent to a firing line side of the mast, and the firing line extends through the moonpool, the hoisting device is adapted to be used for drilling or drilling related operations, the hoisting device includes one or more cables and one or more associated winches to manipulate the position of the load attachment device relative to the mast;
a drill floor provided at the firing line side of the mast, which covers a portion of the moonpool while the firing line extends through an opening in said drill floor;
a riser-tensioner for exerting a tensile force from the drilling vessel upon a riser, wherein the riser-tensioner is provided below the drill floor;
and
drilling equipment for performing auxiliary operations for the drilling or drilling related operations, wherein the drilling equipment comprises one or more of:
a pipe storage for storing drill pipes in a substantially horizontal position,
a riser storage for storing risers in a substantially horizontal position,
a BOP storage area for storing a BOP (Blow Out Preventer),
a silo room for accommodating silos,
a mud tank for storing drilling mud,
a storage tank for storing fluids,
a pump room for accommodating pumps, and
burner booms,
wherein the drill floor is flush with the upper deck, and the drilling equipment and marine equipment are provided in the hull of the vessel below the upper deck,
wherein a ventilation system is provided in the hull of the vessel, comprising ventilation intake shafts and ventilation exhaust shafts, and
wherein the ventilation intake shafts and ventilation exhaust shafts open out at a level below the upper deck.

16. The monohull offshore drilling vessel according to claim 15, wherein there are no ventilation shafts extending through the upper deck.

* * * * *